(12) United States Patent
Lee et al.

(10) Patent No.: US 12,249,161 B2
(45) Date of Patent: Mar. 11, 2025

(54) VEHICLE TAILLIGHT RECOGNITION BASED ON A VELOCITY ESTIMATION

(71) Applicant: TOYOTA RESEARCH INSTITUTE, INC., Los Altos, CA (US)

(72) Inventors: Kuan-Hui Lee, San Jose, CA (US); Charles Christopher Ochoa, San Francisco, CA (US); Arjun Bhargava, San Francisco, CA (US); Chao Fang, Sunnyvale, CA (US)

(73) Assignees: TOYOTA RESEARCH INSTITUTE, INC., Los Altos, CA (US); TOYOTA JIDOSHA KABUSHIKI KAISHA, Toyota (JP)

( * ) Notice: Subject to any disclaimer, the term of this patent is extended or adjusted under 35 U.S.C. 154(b) by 320 days.

(21) Appl. No.: 17/732,401

(22) Filed: Apr. 28, 2022

(65) Prior Publication Data
US 2023/0351774 A1 Nov. 2, 2023

(51) Int. Cl.
*G06V 20/58* (2022.01)
*B60W 30/09* (2012.01)
(Continued)

(52) U.S. Cl.
CPC .......... *G06V 20/584* (2022.01); *B60W 30/09* (2013.01); *G06V 10/25* (2022.01); *G06V 10/82* (2022.01);
(Continued)

(58) Field of Classification Search
CPC ...... G06V 20/584; G06V 10/82; G06V 20/56; G06V 10/764; G06V 20/588; G06V 20/58;
(Continued)

(56) References Cited

U.S. PATENT DOCUMENTS 6,317,691 B1 * 11/2001 Narayan ................. G08G 1/166
701/28
9,864,916 B2 * 1/2018 Botusescu ............ G06V 20/584
(Continued)

OTHER PUBLICATIONS

Fossard et al. "Deepsignals: Predicting intent of drivers through visual signals" May 3, 2019 (Year: 2019).*
(Continued)

*Primary Examiner* — Steven B Theriault
(74) *Attorney, Agent, or Firm* — Seyfarth Shaw LLP

(57) ABSTRACT

A method for controlling an ego vehicle in an environment includes associating, by a velocity model, one or more objects within the environment with a respective velocity instance label. The method also includes selectively, by a recurrent network of the taillight recognition system, focusing on a selected region of the sequence of images according to a spatial attention model for a vehicle taillight recognition task. The method further includes concatenating the selected region with the respective velocity instance label of each object of the one or more objects within the environment to generate a concatenated region label. The method still further includes planning a trajectory of the ego vehicle based on inferring, at a classifier of the taillight recognition system, an intent of each object of the one or more objects according to a respective taillight state of each object, as determined based on the concatenated region label.

20 Claims, 11 Drawing Sheets

(51) Int. Cl.
  *G06V 10/25* (2022.01)
  *G06V 10/82* (2022.01)
  *G06V 20/70* (2022.01)
  *G08G 1/052* (2006.01)
  *G08G 1/16* (2006.01)
  *B60W 60/00* (2020.01)

(52) U.S. Cl.
  CPC ............ *G06V 20/70* (2022.01); *G08G 1/052* (2013.01); *G08G 1/166* (2013.01); *B60W 60/001* (2020.02); *B60W 2420/403* (2013.01); *B60W 2420/408* (2024.01); *B60W 2554/4042* (2020.02); *B60W 2554/4045* (2020.02)

(58) Field of Classification Search
  CPC ............... G05D 1/0246; G05D 1/693; B60W 2420/403; B60W 2420/408
  See application file for complete search history.

(56) References Cited

U.S. PATENT DOCUMENTS

| | | | |
|---|---|---|---|
| 10,387,736 | B2* | 8/2019 | Wang ................... G06V 10/82 |
| 10,691,962 | B2 | 6/2020 | Mei et al. |
| 10,732,640 | B2* | 8/2020 | Boulton ................ G05D 1/024 |
| 10,853,673 | B2* | 12/2020 | Moosaei ............. G06V 10/764 |
| 11,017,671 | B2 | 5/2021 | Wong et al. |
| 11,077,845 | B2 | 8/2021 | Shalev-Shwartz et al. |
| 11,176,647 | B2* | 11/2021 | Auner ...................... G06T 5/92 |
| 2004/0234136 | A1* | 11/2004 | Zhu ..................... G06V 10/255 382/103 |
| 2007/0221822 | A1* | 9/2007 | Stein ..................... B60Q 1/143 250/205 |
| 2008/0165028 | A1* | 7/2008 | Fechner ................. G08G 1/163 340/901 |
| 2009/0073258 | A1* | 3/2009 | Robert ...................... G06T 7/97 348/148 |
| 2012/0176499 | A1* | 7/2012 | Winter .................. G06V 20/584 382/104 |
| 2013/0129150 | A1* | 5/2013 | Saito ....................... G06V 20/58 382/104 |
| 2015/0185003 | A1* | 7/2015 | Suh .......................... G01C 3/22 701/300 |
| 2017/0248441 | A1* | 8/2017 | Heimrath ........... G01C 21/3667 |
| 2018/0067194 | A1* | 3/2018 | Wodrich ............... G01S 13/931 |
| 2019/0087672 | A1* | 3/2019 | Wang ..................... G06V 20/41 |
| 2019/0156132 | A1* | 5/2019 | Moosaei ................... G06T 7/90 |
| 2019/0354786 | A1 | 11/2019 | Lee et al. |
| 2019/0370574 | A1* | 12/2019 | Wang ................... G05D 1/0246 |
| 2020/0125095 | A1* | 4/2020 | Lengsfeld ............ G05D 1/0246 |
| 2020/0142408 | A1* | 5/2020 | Valois .................. G05D 1/0231 |
| 2020/0234066 | A1* | 7/2020 | Lee ....................... G05D 1/0251 |
| 2020/0324781 | A1* | 10/2020 | Hayakawa ................ G06T 7/73 |
| 2020/0327343 | A1* | 10/2020 | Lund ....................... H04W 4/46 |
| 2021/0039664 | A1* | 2/2021 | Nakamura ............. G06N 20/00 |
| 2021/0103746 | A1* | 4/2021 | Chen ........................ G06N 3/04 |
| 2021/0183026 | A1* | 6/2021 | Auner ....................... G06T 5/92 |
| 2021/0271907 | A1* | 9/2021 | Bogacki ................. G06V 10/82 |
| 2021/0383553 | A1* | 12/2021 | Guizilini .................. G06T 7/20 |
| 2022/0315036 | A1* | 10/2022 | Stenson .............. B60W 60/001 |
| 2022/0315049 | A1* | 10/2022 | Stenson ................. G06N 20/00 |
| 2022/0317300 | A1* | 10/2022 | Stenson ................ G06V 20/58 |
| 2023/0162508 | A1* | 5/2023 | Xia ................. B60W 60/00274 382/104 |

OTHER PUBLICATIONS

Lee et al. "At attention based recurrent convolution network for vehicle taillight recognition" Jun. 9, 2019. (Year: 2019).*

Wang et al. "Appearance based brake lights recognition using deep learning and vehicle detection". Jun. 19, 2016 (Year: 2019).*

Lee, et al.,PillarFlow: End-to-end Birds-eye-view Flow Estimation for Autonomous Driving, arXiv:2008.01179, Aug. 2020.

* cited by examiner

VEHICLE TAILLIGHT RECOGNITION BASED ON A VELOCITY ESTIMATION

BACKGROUND

Field

Certain aspects of the present disclosure generally relate to vehicle taillight recognition and, more particularly, to a system and method for using a velocity estimation for recognizing a vehicle taillight.

Background

Autonomous agents (e.g., vehicles, robots, etc.) rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing because of the desire to recover a three-dimensional (3D) structure of the world from images and use the 3D structure for fully understanding a scene. That is, machine vision strives to provide a high-level understanding of a surrounding environment, as performed by the human visual system.

In operation, autonomous agents may rely on a trained convolutional neural network (CNN) to identify objects within areas of interest in an image of a surrounding scene of the autonomous agent. For example, a CNN may be trained to identify and track objects captured by sensors, such as light detection and ranging (LIDAR) sensors, sonar sensors, red-green-blue (RGB) cameras, RGB-depth (RGB-D) cameras, and the like. The sensors may be coupled to, or in communication with, a device, such as an autonomous agent. Object detection applications for autonomous agents may analyze sensor image data for detecting objects in the surrounding scene from the autonomous agent.

Autonomous agents, such as driverless cars and robots, may interact with other non-autonomous vehicles. Therefore, when planning a trajectory for the autonomous agent, an autonomous driving system may predict an intent of other vehicles, such as other non-autonomous and/or other autonomous vehicles. In such examples, vehicle taillight recognition may be used to determine an intent of another vehicle. In some examples, after recognizing a taillight, the autonomous driving system may determine if a brake light or a turn signal is activated. Accordingly, recognizing a vehicle taillight may be used to predict an intent of an autonomous dynamic object (ADO) vehicle and to plan a trajectory of an ego vehicle based on the predicted intent. Various systems are used to recognize vehicle taillights. It may be desirable to further improve an accuracy of such systems.

SUMMARY

In one aspect of the present disclosure, a method for controlling an ego vehicle in an environment includes associating, by a velocity model of a taillight recognition system, one or more objects within the environment with a respective velocity instance label. The method further includes selectively, by a recurrent network of the taillight recognition system, focusing on a selected region of a sequence of images according to a spatial attention model for a vehicle taillight recognition task. The method still further includes concatenating the selected region with the respective velocity instance label of each object of the one or more objects within the environment to generate a concatenated region label. The method also includes inferring, at a classifier of the taillight recognition system, an intent of the one or more objects according to a respective taillight state of each object, as determined based on the concatenated region label. The method further includes planning a trajectory of the ego vehicle based on inferring the intent of the one or more objects.

Another aspect of the present disclosure is directed to an apparatus including means for associating, by a velocity model of a taillight recognition system, one or more objects within the environment with a respective velocity instance label. The apparatus further includes means for selectively, by a recurrent network of the taillight recognition system, focusing on a selected region of a sequence of images according to a spatial attention model for a vehicle taillight recognition task. The apparatus still further includes means for concatenating the selected region with the respective velocity instance label of each object of the one or more objects within the environment to generate a concatenated region label. The apparatus also includes means for inferring, at a classifier of the taillight recognition system, an intent of the one or more objects according to a respective taillight state of each object, as determined based on the concatenated region label. The apparatus further includes means for planning a trajectory of the ego vehicle based on inferring the intent of the one or more objects.

In another aspect of the present disclosure, a non-transitory computer-readable medium with non-transitory program code recorded thereon is disclosed. The program code is executed by a processor and includes program code to associate, by a velocity model of a taillight recognition system, one or more objects within the environment with a respective velocity instance label. The program code further includes program code to selectively focus, by a recurrent network of the taillight recognition system, on a selected region of a sequence of images according to a spatial attention model for a vehicle taillight recognition task. The program code still further includes program code to concatenate the selected region with the respective velocity instance label of each object of the one or more objects within the environment to generate a concatenated region label. The program code also includes program code to infer, at a classifier of the taillight recognition system, an intent of the one or more objects according to a respective taillight state of each object, as determined based on the concatenated region label. The program code further includes program code to plan a trajectory of the ego vehicle based on inferring the intent of the one or more objects.

An apparatus comprising a processor, and a memory coupled with the processor and storing instructions operable, when executed by the processor, to cause the apparatus to associate, by a velocity model of a taillight recognition system, one or more objects within the environment with a respective velocity instance label. Execution of the instructions also cause the apparatus to selectively focus, by a recurrent network of the taillight recognition system, on a selected region of a sequence of images according to a spatial attention model for a vehicle taillight recognition task. Execution of the instructions also cause the apparatus to concatenate the selected region with the respective velocity instance label of each object of the one or more objects within the environment to generate a concatenated region label. Execution of the instructions further cause the apparatus to infer, at a classifier of the taillight recognition system, an intent of the one or more objects according to a respective taillight state of each object, as determined based on the concatenated region label. Execution of the instructions still further cause the apparatus to plan a trajectory of the ego vehicle based on inferring the intent of the one or more objects.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1A:
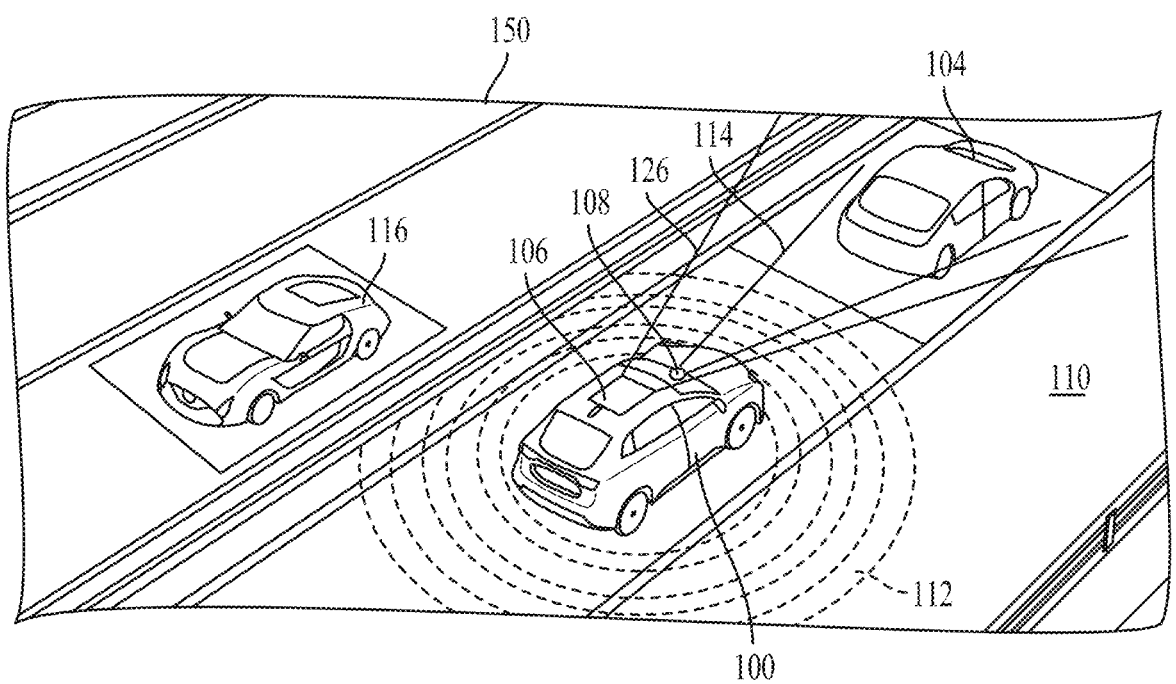
FIG. 1A is a diagram illustrating an example of a vehicle in an environment 150 in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As discussed, it may be desirable for a vehicle, such as an autonomous vehicle, to recognize vehicle taillights. For example, taillight recognition may allow the vehicle to determine if a brake light or a turn signal is active. In some examples, a collision may be avoided if an ego vehicle determines that a brake light or a turn signal of another vehicle (e.g., an autonomous dynamic object (ADO) vehicle) is active. That is, vehicle taillight recognition may be used for predicting an intent of an ADO vehicle and planning a trajectory of an ego vehicle. Various systems are used to recognize vehicle taillights. It may be desirable to further improve an accuracy of such systems.

Aspects of the present disclosure are directed to an end-to-end framework for vehicle taillight recognition. In some aspects, vehicle velocity is used as a prior for improving taillight recognition. Specifically, the velocity of an ADO vehicle may be used in conjunction with an initial prediction of the ADO vehicle's intent to recognize a taillight of the ADO vehicle. In some examples, the taillight recognition system may use the velocity to focus on moving vehicles, thereby improving the taillight recognition. That is, based on the determined velocity, the taillight recognition system may reduce weights of stationary vehicles and focus more attention on moving vehicles. The velocity may be determined using various methodologies. In some examples, a flow network is used to determine the velocity. The flow network generates a two-dimensional (2D) flow vector for each grid in a cell, where the cell represents a snapshot of an environment.

In some examples, an initial intent of an ADO vehicle may be predicted via a convolutional neural network (CNN)-long short-term memory (CNN-LSTM) framework for vehicle taillight recognition. In such examples, a spatial attention model is integrated with a CNN of the CNN-LSTM framework for training the CNN-LSTM framework to selectively focus on certain regions of the images in a sequence of images. In addition, a temporal attention model may be integrated with an LSTM network of the CNN-LSTM framework to train the LSTM network for frame selection within a selected region of the sequence of images. For example, the spatial attention model may be configured along a temporal dimension (e.g., direction) to focus on portions of the sequence of images important to vehicle taillight recognition. In some examples, the velocity may be used during training to improve the focus on portions of the sequence of images important to vehicle taillight recognition.

Operation of autonomous vehicles and semi-autonomous vehicles may be controlled or adjusted based on predicted actions (e.g., behaviors) of surrounding agents, such as vehicles and pedestrians. For example, a route may be planned for an autonomous vehicle (e.g., an ego vehicle) based on the predicted actions of surrounding agents (e.g., an ado vehicle). In addition, a route may be adjusted to avoid a collision based on the predicted actions of surrounding agents. In the present disclosure, unless otherwise noted, a vehicle refers to an autonomous agent or a semi-autonomous agent.

Conventional vehicles are controlled based on predicted trajectories of surrounding agents. The trajectories of surrounding agents may be predicted using Markov chains, or other probabilistic approaches, to provide a low-level prediction of movements. The trajectories predict where an agent may travel from a current time to a future time. These predicted trajectories may adjust a route of the autonomous agent (e.g., an ego vehicle) to avoid a collision based on the predicted actions of surrounding agents (e.g., an ado vehicle).

Development of perception technologies enable autonomous vehicles to drive well on the road without human involvement. Nevertheless, higher level concepts such as intention prediction, human-machine interaction, and vehicle-to-vehicle communication remain open questions. In particular, intention prediction of ado vehicles is an important feature for autonomous driving safety. Achieving attention prediction of the ado vehicle by an ego vehicle involves understanding gestures from the ado vehicle (e.g., turn and brake signals).

According to aspects of the present disclosure, the velocity of surrounding objects may be used in conjunction with a CNN-LSTM framework that obtains spatial and temporal dimensions via one or more attention models. The use of velocity with spatial attention models and temporal attention models may improve an emphasis on focal regions of the images as well as more important time steps of the image sequence. As a result, the proposed framework outperforms the baseline results by achieving better inference prediction of an ado vehicle's intention(s) with improved performance accuracy.

Various aspects of the present disclosure may be implemented in an agent, such as a vehicle. The vehicle may operate in either an autonomous mode, a semi-autonomous mode, or a manual mode. In some examples, the vehicle may switch between operating modes. FIG. 1A is a diagram illustrating an example of a vehicle 100 in an environment 150, in accordance with various aspects of the present disclosure. In the example of FIG. 1A, the vehicle 100 may be an autonomous vehicle, a semi-autonomous vehicle, or a non-autonomous vehicle. As shown in FIG. 1A, the vehicle 100 may be traveling on a road 110. A first vehicle 104 may be ahead of the vehicle 100 and a second vehicle 116 may be adjacent to the ego vehicle 100. In this example, the vehicle 100 may include a 2D camera 108, such as a 2D red-green-blue (RGB) camera, and a LiDAR sensor 106. Other sensors, such as radar and/or ultrasound, are also contemplated. Additionally, or alternatively, although not shown in FIG. 1A, the vehicle 100 may include one or more additional sensors, such as a camera, a radar sensor, and/or a LiDAR sensor, integrated with the vehicle in one or more locations, such as within one or more storage locations (e.g., a trunk). Additionally, or alternatively, although not shown in FIG. 1A, the vehicle 100 may include one or more force measuring sensors.

In one configuration, the 2D camera 108 captures a 2D image that includes objects in the 2D camera's 108 field of view 114. The LiDAR sensor 106 may generate one or more output streams. The first output stream may include a three-dimensional (3D) cloud point of objects in a first field of view, such as a 360° field of view 112 (e.g., bird's eye view). The second output stream 124 may include a 3D cloud point of objects in a second field of view, such as a forward facing field of view.

The 2D image captured by the 2D camera includes a 2D image of the first vehicle 104, as the first vehicle 104 is in the 2D camera's 108 field of view 114. As is known to those of skill in the art, a LiDAR sensor 106 uses laser light to sense the shape, size, and position of objects in an environment. The LiDAR sensor 106 may vertically and horizontally scan the environment. In the current example, the artificial neural network (e.g., autonomous driving system) of the vehicle 100 may extract height and/or depth features from the first output stream. In some examples, an autonomous driving system of the vehicle 100 may also extract height and/or depth features from the second output stream.

The information obtained from the sensors 106, 108 may be used to evaluate a driving environment. In some examples, the information obtained from the sensors 106, 108 may identify whether the vehicle 100 is at an interaction or a crosswalk. Additionally, or alternatively, the information obtained from the sensors 106, 108 may identify whether one or more dynamic objects, such as pedestrians, are near the vehicle 100.

Figure 1B:
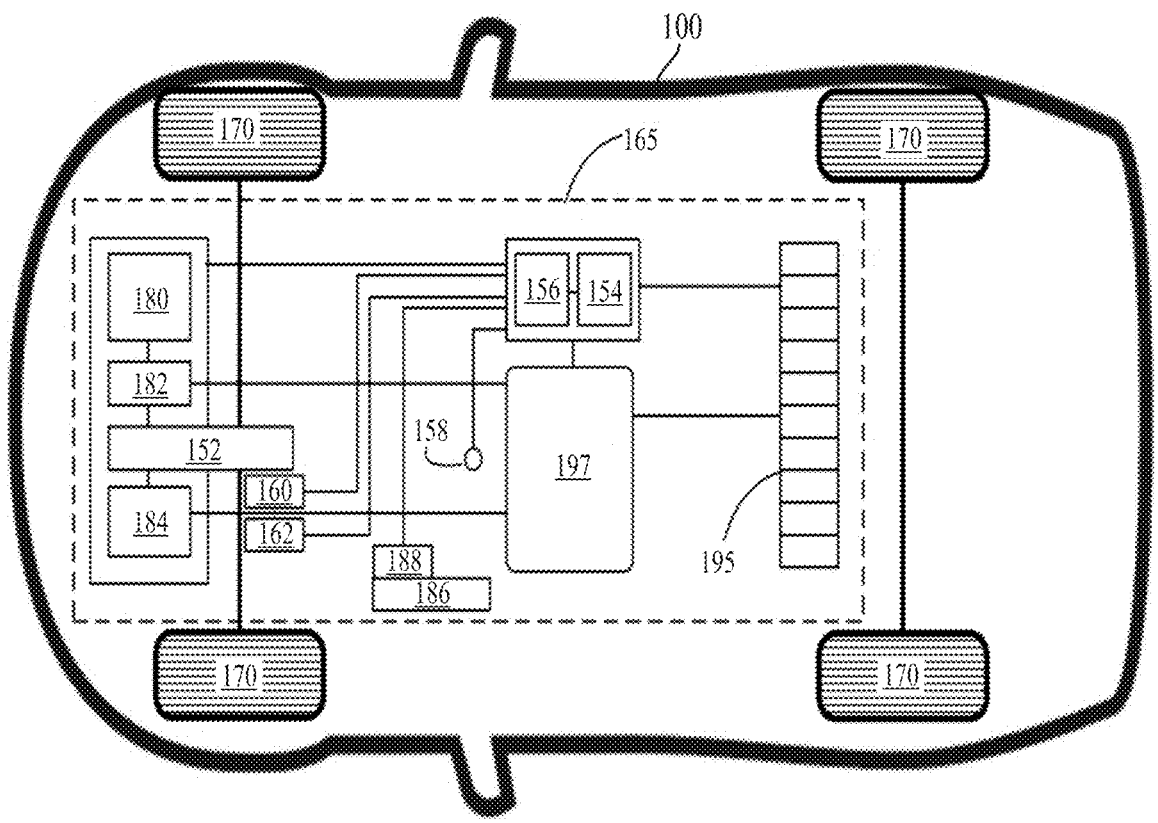
FIG. 1B is a diagram illustrating an example a vehicle, in accordance with various aspects of the present disclosure.

FIG. 1B is a diagram illustrating an example a vehicle 100, in accordance with various aspects of the present disclosure. It should be understood that various aspects of the present disclosure may be directed to an autonomous vehicle.

The autonomous vehicle may include be an internal combustion engine (ICE) vehicle, fully electric vehicle (EVs), or another type of vehicle. The vehicle 100 may include drive force unit 165 and wheels 170. The drive force unit 165 may include an engine 180, motor generators (MGs) 182 and 184, a battery 195, an inverter 197, a brake pedal 186, a brake pedal sensor 188, a transmission 152, a memory 154, an electronic control unit (ECU) 156, a shifter 158, a speed sensor 160, and an accelerometer 162.

The engine 180 primarily drives the wheels 170. The engine 180 can be an ICE that combusts fuel, such as gasoline, ethanol, diesel, biofuel, or other types of fuels which are suitable for combustion. The torque output by the engine 180 is received by the transmission 152. MGs 182 and 184 can also output torque to the transmission 152. The engine 180 and MGs 182 and 184 may be coupled through a planetary gear (not shown in FIG. 1B). The transmission 152 delivers an applied torque to one or more of the wheels 170. The torque output by engine 180 does not directly translate into the applied torque to the one or more wheels 170.

MGs 182 and 184 can serve as motors which output torque in a drive mode, and can serve as generators to recharge the battery 195 in a regeneration mode. The electric power delivered from or to MGs 182 and 184 passes through the inverter 197 to the battery 195. The brake pedal sensor 188 can detect pressure applied to brake pedal 186, which may further affect the applied torque to wheels 170. The speed sensor 160 is connected to an output shaft of transmission 152 to detect a speed input which is converted into a vehicle speed by ECU 156. The accelerometer 162 is connected to the body of vehicle 100 to detect the actual deceleration of vehicle 100, which corresponds to a deceleration torque.

The transmission 152 may be a transmission suitable for any vehicle. For example, transmission 152 can be an electronically controlled continuously variable transmission (ECVT), which is coupled to engine 180 as well as to MGs 91 and 92. Transmission 20 can deliver torque output from a combination of engine 180 and MGs 91 and 92. The ECU 156 controls the transmission 152, utilizing data stored in memory 154 to determine the applied torque delivered to the wheels 170. For example, ECU 156 may determine that at a certain vehicle speed, engine 180 should provide a fraction of the applied torque to the wheels 170 while one or both of the MGs 182 and 184 provide most of the applied torque. The ECU 156 and transmission 152 can control an engine speed (NE) of engine 180 independently of the vehicle speed (V).

The ECU 156 may include circuitry to control the above aspects of vehicle operation. Additionally, the ECU 156 may include, for example, a microcomputer that includes a one or more processing units (e.g., microprocessors), memory storage (e.g., RAM, ROM, etc.), and I/O devices. The ECU 156 may execute instructions stored in memory to control one or more electrical systems or subsystems in the vehicle. Furthermore, the ECU 156 can include one or more electronic control units such as, for example, an electronic engine control module, a powertrain control module, a transmission control module, a suspension control module, a body control module, and so on. As a further example, electronic control units may control one or more systems and functions such as doors and door locking, lighting, human-machine interfaces, cruise control, telematics, braking systems (e.g., anti-lock braking system (ABS) or electronic stability control (ESC)), or battery management systems, for example. These various control units can be implemented using two or more separate electronic control units, or a single electronic control unit.

The MGs 182 and 184 each may be a permanent magnet type synchronous motor including for example, a rotor with a permanent magnet embedded therein. The MGs 182 and 184 may each be driven by an inverter controlled by a control signal from ECU 156 so as to convert direct current (DC) power from the battery 195 to alternating current (AC) power, and supply the AC power to the MGs 182 and 184. In some examples, a first MG 182 may be driven by electric power generated by a second MG 184. It should be understood that in embodiments where MGs 182 and 184 are DC motors, no inverter is required. The inverter, in conjunction with a converter assembly may also accept power from one or more of the MGs 182 and 184 (e.g., during engine charging), convert this power from AC back to DC, and use this power to charge the battery 195 (hence the name, motor generator). The ECU 156 may control the inverter, adjust driving current supplied to the first MG 182, and adjust the current received from the second MG 184 during regenerative coasting and braking.

The battery 195 may be implemented as one or more batteries or other power storage devices including, for example, lead-acid batteries, lithium ion, and nickel batteries, capacitive storage devices, and so on. The battery 195 may also be charged by one or more of the MGs 182 and 184, such as, for example, by regenerative braking or by coasting during which one or more of the MGs 182 and 184 operates as generator. Alternatively (or additionally, the battery 195 can be charged by the first MG 182, for example, when vehicle 100 is in idle (not moving/not in drive). Further still, the battery 195 may be charged by a battery charger (not shown) that receives energy from engine 180. The battery charger may be switched or otherwise controlled to engage/disengage it with battery 195. For example, an alternator or generator may be coupled directly or indirectly to a drive shaft of engine 180 to generate an electrical current as a result of the operation of engine 180. Still other embodiments contemplate the use of one or more additional motor generators to power the rear wheels of the vehicle 100 (e.g., in vehicles equipped with 4-Wheel Drive), or using two rear motor generators, each powering a rear wheel.

The battery 195 may also power other electrical or electronic systems in the vehicle 100. In some examples, the battery 195 can include, for example, one or more batteries, capacitive storage units, or other storage reservoirs suitable for storing electrical energy that can be used to power one or both of the MGs 182 and 184. When the battery 195 is implemented using one or more batteries, the batteries can include, for example, nickel metal hydride batteries, lithium ion batteries, lead acid batteries, nickel cadmium batteries, lithium ion polymer batteries, or other types of batteries.

The vehicle 100 may operate in one of an autonomous mode, a manual mode, or a semi-autonomous mode. In the manual mode, a human driver manually operates (e.g., controls) the vehicle 100. In the autonomous mode, an autonomous control system (e.g., autonomous driving system) operates the vehicle 100 without human intervention. In the semi-autonomous mode, the human may operate the vehicle 100, and the autonomous control system may override or assist the human. For example, the autonomous control system may override the human to prevent a collision or to obey one or more traffic rules.

Figure 1C:
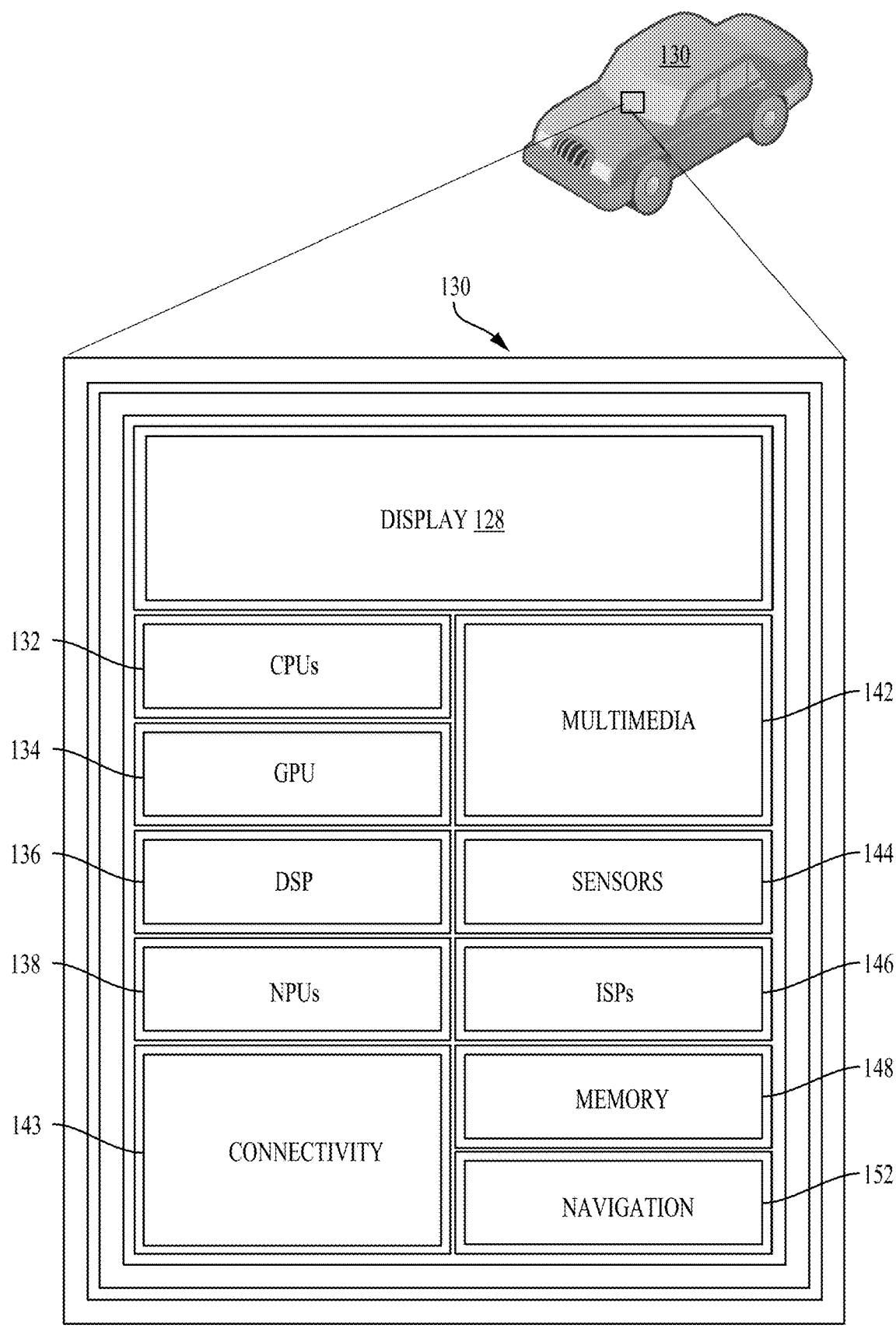
FIG. 1C illustrates an example implementation of designing a neural network using a system-on-a-chip (SOC) for a vehicle taillight recognition system of an autonomous vehicle, in accordance with various aspects of the present disclosure.

FIG. 1C illustrates an example implementation of the aforementioned system and method for a convolutional neural network (CNN)-long short-term memory (CNN-LSTM) framework for vehicle taillight recognition using a system-on-a-chip (SOC) 130 of a vehicle vision system for an autonomous vehicle 100. The SOC 130 may include a single processor or multi-core processors (e.g., a central processing unit (CPU) 132), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 138, a CPU 132, a graphics processing unit (GPU) 134, a digital signal processor (DSP) 136, a dedicated memory block 148, or may be distributed across multiple blocks. Instructions executed at a processor (e.g., CPU 132) may be loaded from a program memory associated with the CPU 132 or may be loaded from the dedicated memory block 148.

The SOC 130 may also include additional processing blocks configured to perform specific functions, such as the GPU 134, the DSP 136, and a connectivity block 143, which may include fourth generation long term evolution (4G LTE) connectivity, unlicensed Wi-Fi connectivity, USB connectivity, Bluetooth connectivity, and the like. In addition, a multimedia processor 142 in combination with a display 128 may, for example, classify and categorize poses of objects in an area of interest, according to the display 128 illustrating a view of the vehicle 100. In some aspects, the NPU 138 may be implemented in the CPU 132, DSP 136, and/or GPU 134. The SOC 130 may further include a sensor processor 144, image signal processors (ISPs) 146, and/or navigation 120, which may, for instance, include a global positioning system.

The SOC 130 may be based on an Advanced Risk Machine (ARM) instruction set or the like. In another aspect of the present disclosure, the SOC 130 may be a server computer in communication with the autonomous vehicle 100. In this arrangement, the autonomous vehicle 100 may include a processor and other features of the SOC 130. In this aspect of the present disclosure, instructions loaded into a processor (e.g., CPU 132) or the NPU 138 of the autonomous vehicle 100 may include code for detecting/recognizing vehicle taillights of an ado vehicle in a region of interest in an image captured by the sensor processor 144. The instructions loaded into a processor (e.g., CPU 132) may also include code for planning and control (e.g., intention prediction of the ado vehicle) in response to the vehicle taillights of the ado vehicle detected/recognized in the region of interest in the image captured by the sensor processor 144.

Figure 2:
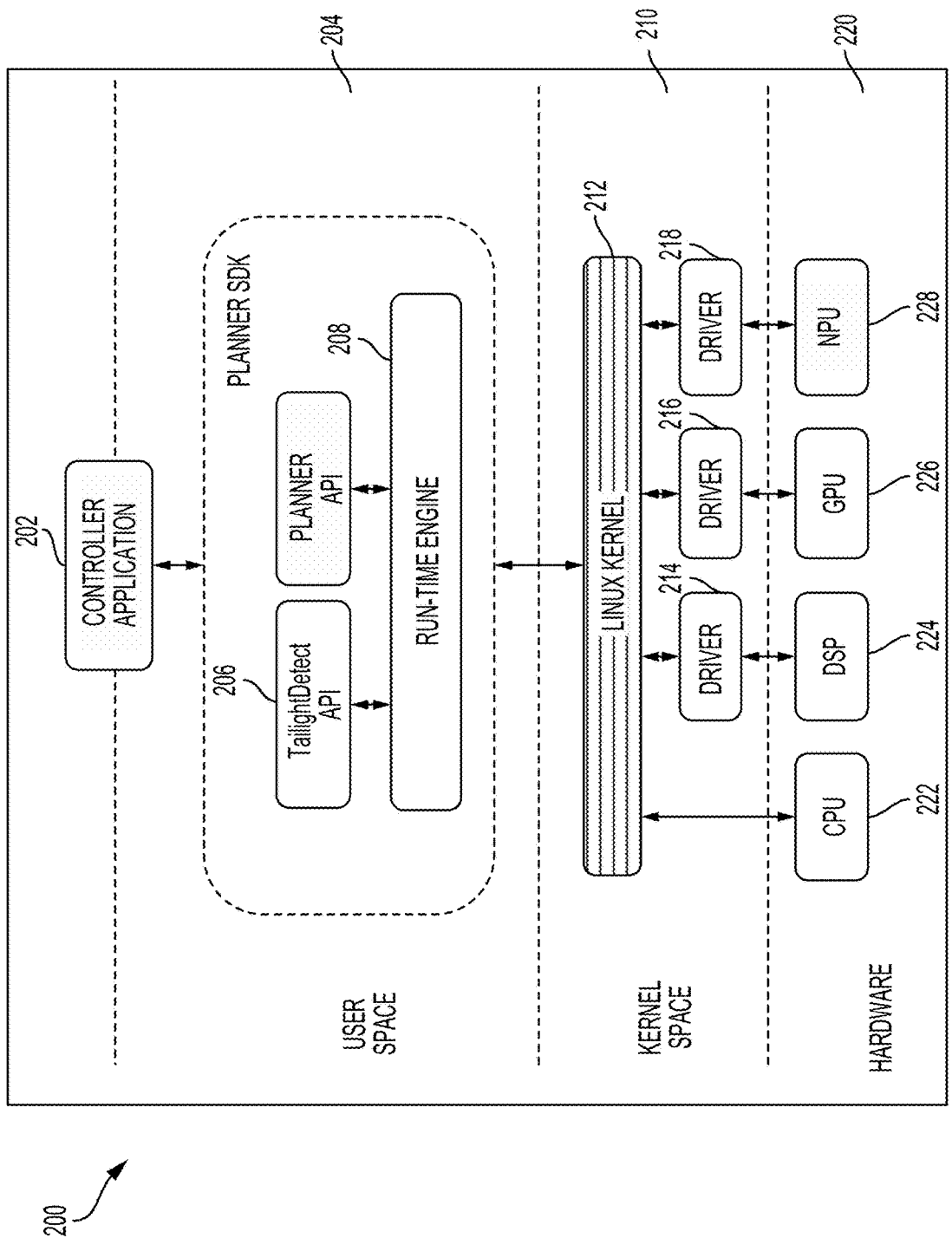
FIG. 2 is a block diagram illustrating a software architecture that may modularize artificial intelligence (AI) functions for vehicle taillight recognition of an autonomous agent vision system, in accordance with various aspects of the present disclosure.

FIG. 2 is a block diagram illustrating a software architecture 200 that may modularize artificial intelligence (AI) functions for planning and control of an autonomous agent for inferring ado vehicle intention in response to ado vehicle taillight recognition, according to aspects of the present disclosure. Using the architecture, a controller application 202 may be designed such that it may cause various processing blocks of an SOC 220 (for example a CPU 222, a DSP 224, a GPU 226 and/or an NPU 228) to perform supporting computations during run-time operation of the controller application 202.

The controller application 202 may be configured to call functions defined in a user space 204 that may, for example, provide for taillight recognition of ado vehicles. The controller application 202 may make a request to compile program code associated with a library defined in a taillight prediction application programming interface (API) 206 to perform taillight recognition of an ado vehicle. This request may ultimately rely on the output of a convolutional neural network configured to focus on portions of the sequence of images critical to vehicle taillight recognition.

A run-time engine 208, which may be compiled code of a runtime framework, may be further accessible to the controller application 202. The controller application 202 may cause the run-time engine 208, for example, to take actions for controlling the autonomous agent. When an ado vehicle is detected within a predetermined distance of the autonomous agent, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
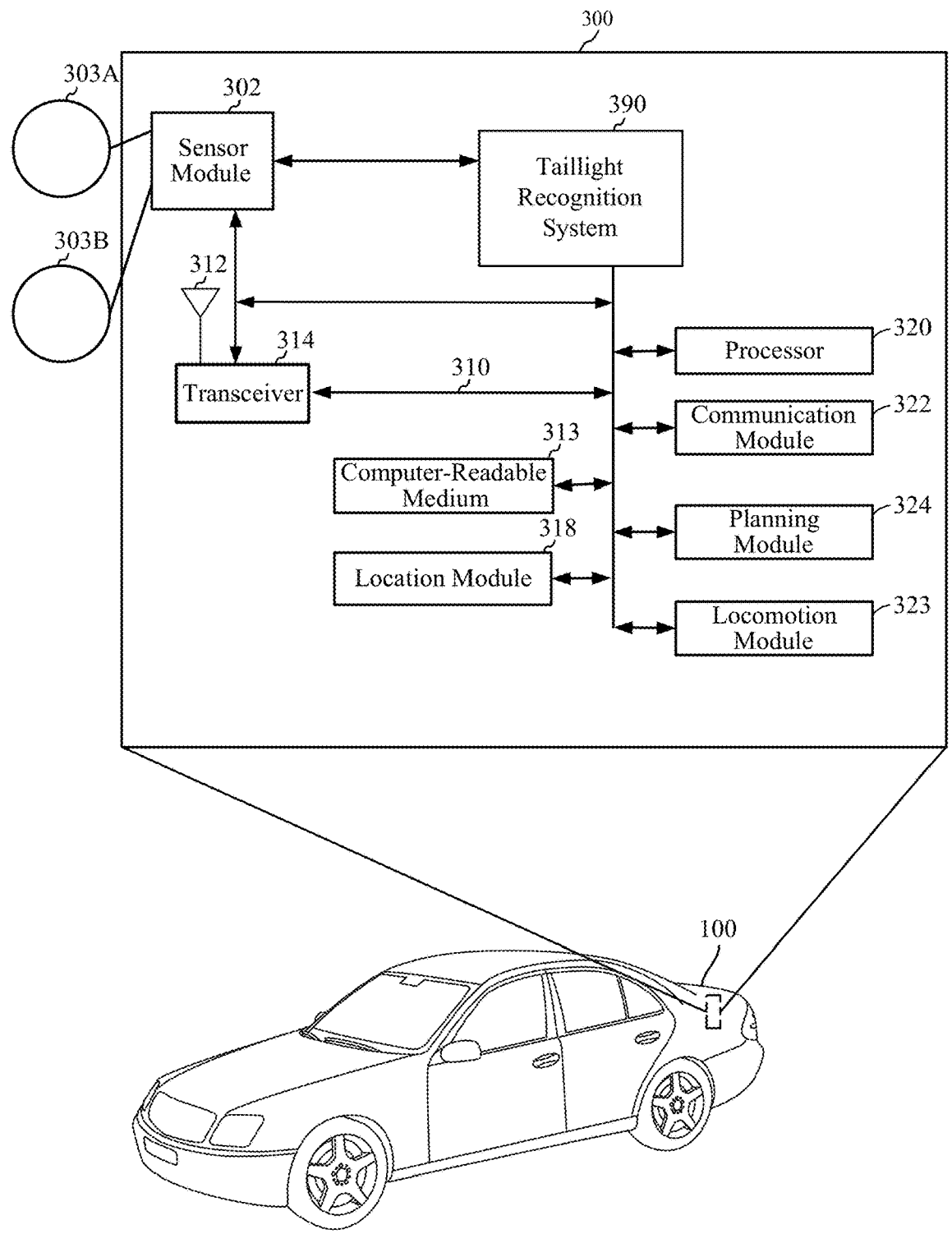
FIG. 3 is a diagram illustrating an example of a hardware implementation for a vehicle taillight recognition system, in accordance with various aspects of the present disclosure.

FIG. 3 is a diagram illustrating an example of a hardware implementation for a vehicle control system 300, according to aspects of the present disclosure. The vehicle control system 300 may be a component of a vehicle, a robotic device, or other device. For example, as shown in FIG. 3, the vehicle control system 300 is a component of a vehicle 100. Aspects of the present disclosure are not limited to the vehicle control system 300 being a component of the vehicle 100, as other devices, such as a bus, boat, drone, or robot, are also contemplated for using the vehicle control system 300. In the example of FIG. 3, the vehicle system may include a taillight recognition system 390. In some examples, taillight recognition system 390 is configured to perform operations, including operations of the process 700 described with reference to FIG. 7.

The vehicle control system 300 may be implemented with a bus architecture, represented generally by a bus 330. The bus 330 may include any number of interconnecting buses and bridges depending on the specific application of the vehicle control system 300 and the overall design constraints. The bus 330 links together various circuits including one or more processors and/or hardware modules, represented by a processor 320, a communication module 322, a location module 318, a sensor module 302, a locomotion module 323, a planning module 324, and a computer-readable medium 313. The bus 330 may also link various other circuits such as timing sources, peripherals, voltage regulators, and power management circuits, which are well known in the art, and therefore, will not be described any further.

The vehicle control system 300 includes a transceiver 314 coupled to the processor 320, the sensor module 302, a comfort module 308, the communication module 322, the location module 318, the locomotion module 323, the planning module 324, and the computer-readable medium 313. The transceiver 314 is coupled to an antenna 333. The transceiver 314 communicates with various other devices over a transmission medium. For example, the transceiver 314 may receive commands via transmissions from a user or a remote device. As another example, the transceiver 314 may transmit driving statistics and information from the comfort module 308 to a server (not shown).

In one or more arrangements, one or more of the modules 302, 313, 314, 318, 320, 322, 323, 324, 390, can include artificial or computational intelligence elements, such as, neural network, fuzzy logic or other machine learning algorithms. Further, in one or more arrangements, one or more of the modules 302, 313, 314, 318, 320, 322, 323, 324, 390 can be distributed among multiple modules 302, 313, 314, 318, 320, 322, 323, 324, 390 described herein. In one or more arrangements, two or more of the modules 302, 313, 314, 318, 320, 322, 323, 324, 390 of the vehicle control system 300 can be combined into a single module.

The vehicle control system 300 includes the processor 320 coupled to the computer-readable medium 313. The processor 320 performs processing, including the execution of software stored on the computer-readable medium 313 providing functionality according to the disclosure. The software, when executed by the processor 320, causes the vehicle control system 300 to perform the various functions described for a particular device, such as the vehicle 328, or any of the modules 302, 313, 314, 318, 320, 322, 323, 324, 390. The computer-readable medium 313 may also be used for storing data that is manipulated by the processor 320 when executing the software.

The sensor module 302 may be used to obtain measurements via different sensors, such as a first sensor 303A and a second sensor 303B. The first sensor 303A and/or the second sensor 303B may be a vision sensor, such as a stereoscopic camera or a red-green-blue (RGB) camera, for capturing 2D images. In some examples, one or both of the first sensor 303A or the second sensor 303B may be used to identify an intersection, a crosswalk, or another stopping location. Additionally, or alternatively, one or both of the first sensor 303A or the second sensor 303B may identify objects within a range of the vehicle 100. In some examples, one or both of the first sensor 303A or the second sensor 303B may identify a pedestrian or another object in a crosswalk. The first sensor 303A and the second sensor 303B are not limited to vision sensors as other types of sensors, such as, for example, light detection and ranging (LiDAR), a radio detection and ranging (radar), sonar, and/or lasers are also contemplated for either of the sensors 303A, 303B. The measurements of the first sensor 303A and the second sensor 303B may be processed by one or more of the processor 320, the sensor module 302, the comfort module 308, the communication module 322, the location module 318, the locomotion module 323, the planning module 324, in conjunction with the computer-readable medium 313 to implement the functionality described herein. In one configuration, the data captured by the first sensor 303A and the second sensor 303B may be transmitted to an external device via the transceiver 314. The first sensor 303A and the second sensor 303B may be coupled to the vehicle 328 or may be in communication with the vehicle 328.

Additionally, the sensor module 302 may configure the processor 320 to obtain or receive information from the one or more sensors 303A and 303B. The information may be in the form of one or more two-dimensional (2D) image(s) and may be stored in the computer-readable medium 313 as sensor data. In the case of 2D, the 2D image is, for example, an image from the one or more sensors 303A and 303B that encompasses a field-of-view about the vehicle 100 of at least a portion of the surrounding environment, sometimes referred to as a scene. That is, the image is, in one approach, generally limited to a subregion of the surrounding environment. As such, the image may be of a forward-facing (e.g., the direction of travel) 30, 90, 120-degree field-of-view (FOV), a rear/side facing FOV, or some other subregion as defined by the characteristics of the one or more sensors 303A and 303B. In further aspects, the one or more sensors 303A and 303B may be an array of two or more cameras that capture multiple images of the surrounding environment and stitch the images together to form a comprehensive 330-degree view of the surrounding environment. In other examples, the one or more images may be paired stereoscopic images captured from the one or more sensors 303A and 303B having stereoscopic capabilities.

The location module 318 may be used to determine a location of the vehicle 328. For example, the location module 318 may use a global positioning system (GPS) to determine the location of the vehicle 328. The communication module 322 may be used to facilitate communications via the transceiver 314. For example, the communication module 322 may be configured to provide communication capabilities via different wireless protocols, such as Wi-Fi, long term evolution (LTE), 3G, etc. The communication module 322 may also be used to communicate with other components of the vehicle 328 that are not modules of the vehicle control system 300. Additionally, or alternatively, the communication module 322 may be used to communicate with an occupant of the vehicle 100. Such communications may be facilitated via audio feedback from an audio system of the vehicle 100, visual feedback via a visual feedback system of the vehicle, and/or haptic feedback via a haptic feedback system of the vehicle.

The locomotion module 323 may be used to facilitate locomotion of the vehicle 328. As an example, the locomotion module 323 may control movement of the wheels. As another example, the locomotion module 323 may be in communication with a power source of the vehicle 328, such as an engine or batteries. Of course, aspects of the present disclosure are not limited to providing locomotion via wheels and are contemplated for other types of components for providing locomotion, such as propellers, treads, fins, and/or jet engines.

The vehicle control system 300 also includes the planning module 324 for planning a route or controlling the locomotion of the vehicle 328, via the locomotion module 323. A route may be planned to a passenger based on compartment data provided via the comfort module 308. In one configuration, the planning module 324 overrides the user input when the user input is expected (e.g., predicted) to cause a collision. The modules may be software modules running in the processor 320, resident/stored in the computer-readable medium 313, one or more hardware modules coupled to the processor 320, or some combination thereof.

The taillight recognition system 390 may be in communication with the sensor module 302, the transceiver 314, the processor 320, the communication module 322, the location module 318, the locomotion module 323, the planning module 324, and the computer-readable medium 313. In some examples, the behavior planning system may be implemented as a machine learning model, such as a vehicle control system 300 as described with reference to FIG. 3. Working in conjunction with one or more of the sensors 303A, 303B, the sensor module 302, and/or one or more other modules 313, 314, 318, 320, 322, 323, 324, the taillight recognition system 390 may associate, by a velocity model (e.g., velocity head 560) of a taillight recognition system, one or more objects within the environment with a respective velocity instance label. The taillight recognition system 390 may also selectively focus, by a recurrent network (e.g., LSTM 430) of the taillight recognition system, on a selected region of a sequence of images according to a spatial attention model for a vehicle taillight recognition task. Additionally, the taillight recognition system 390 may concatenate the selected region with the respective velocity instance label of each object of the one or more objects within the environment to generate a concatenated region label. Furthermore, the taillight recognition system 390 may infer, at a classifier (e.g., classifier 570) of the taillight recognition system, an intent of the one or more objects according to a respective taillight state of each object, as determined based on the concatenated region label. Also, the taillight recognition system 390 may plan a trajectory of the ego vehicle based on inferring the intent of the one or more objects.

Figure 4:
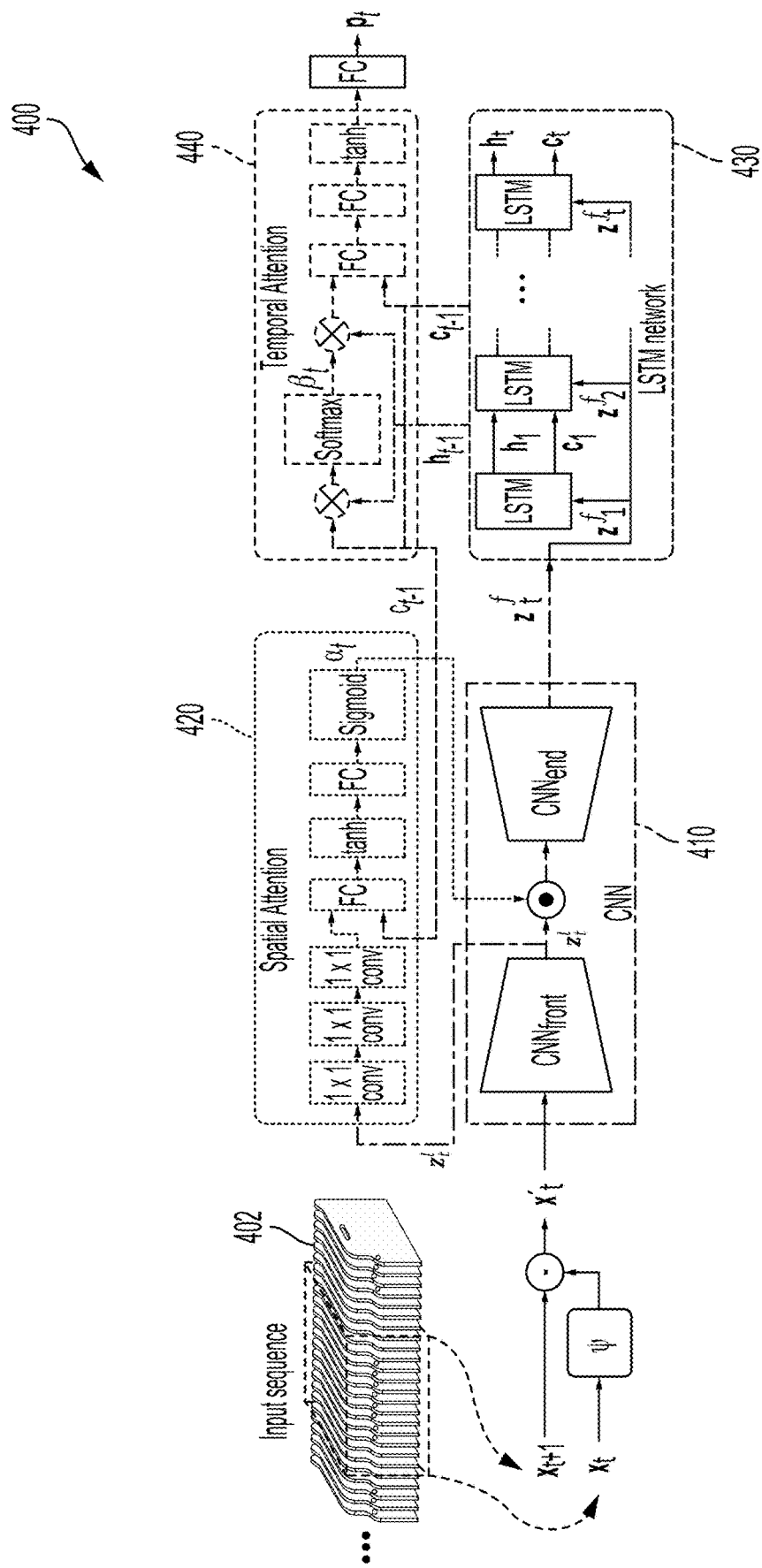
FIG. 4 is a block diagram illustrating a convolutional neural network (CNN)-long short-term memory (CNN-LSTM) framework for vehicle taillight recognition, according to aspects of the present disclosure.

As discussed, various aspects of the present disclosure use a CNN-LSTM framework for recognizing a vehicle taillight. FIG. 4 is a block diagram illustrating a CNN-LSTM framework 400 for vehicle taillight recognition, according to aspects of the present disclosure. The CNN-LSTM framework 400 integrates a spatial attention model 420 and a temporal attention model 440 for vehicle taillight recognition. An overview of the CNN-LSTM framework 400 is shown in FIG. 4.

Representatively, an input image sequence 402 of the CNN-LSTM framework 400 is a chunk of a video sequence, typically sampled by window-sliding along the temporal direction. In this configuration, an instance detection/segmentation technique is used to extract an ego vehicle's bounding boxes from video frames of the input images sequence. For example, assume $X=\{x\}_{t=1}^{T+1}$ is a chunk of a video with T+1 frames, where $x_t$ is the $t^{th}$ frame in the chunk. First, a frame difference $x'_t$ is calculated to align the vehicles in successive frames:

$$x'_t | \Psi^{t \to t+1}(X_t) - X_{t+1} |, \text{ for } t=1, 2, \ldots, T. \quad (1)$$

In EQUATION 1, $\Psi^{t \to t+1}(\cdot)$ is a warping function, from the $t^{th}$ frame to the next frame. In the example of FIG. 4, each image is forwarded to certain layers of a CNN 410 (e.g., $CNN_{front}$) to obtain deep features in the $l^{th}$ players, denoted by $Z^l=\{z_t^l\}_{t=1}^T$. The input of the spatial attention model 420, $z_t^l$, is forwarded to 2D convolutional layers (shown as 1×1 conv). The convolutional layers may be concatenated with an internal state $c_{t-1}$, or a hidden variable $h_{t-1}$ (not shown in FIG. 4) from an LSTM network 430. Then, the concatenated tensors are forwarded to the fully connected layers (FC), the hyperbolic tangent (tanh) layer, and the softmax layer (not shown in FIG. 4) of the spatial attention model 420, to obtain the attention weights $\alpha_t$. An element wise product of the attention weights $\alpha_t$ and $z_t^l$ may be computed at the CNN 410 to obtain selective deep features, which are then forwarded to the remaining portions of layers of the CNN 410 (e.g., $CNN_{end}$) for latent features $Z^f=\{z_t^f\}_{t=1}^T$. The latent features $z_t^f$ are then forwarded to the LSTM network 430 for encoding temporal dependencies.

The input and the output of the LSTM network 430 are recurrent over time steps. At time step t, the input is the latent feature $z_t^f$ from the CNN 410, the hidden variable $h_{t-1}$, and the internal states $c_{t-1}$, while the output is the hidden unit $h_t$ and a memory cell $c_t$ for the next time step t+1. Both $h_t$ and $c_t$ are updated and then passed to the LSTM network 430 at each time step.

The LSTM network 430 outputs a set of hidden variables $H=\{h_t\}_{t=1}^T$ and a set of memory cells $C=\{c_t\}_{t=1}^T$, which may be used in the temporal attention model 440. The temporal attention model 440 calculates the attention by dot-production between decoder context and encoder representations. Instead of multiple decoder layers, however, a single layer is used to receive the output of the LSTM network 430. In some implementations (not shown in FIG. 4), the temporal attention model 440 receives inputs $h_t$ and $c_t$, that are fused to be a set of state summaries $D=\{d_t\}_{t=1}^T$. Then, a matrix product of the hidden variables H and state summaries D may be performed, where the results are forwarded to a softmax layer for attention selection. The attention weights are then applied to the hidden variables H. The adjusted hidden variables H' are followed by fully connected layers and the tanh layer to obtain class probability distribution $P=\{p_t\}_{t=1}^T$.

In some other implementations, as shown in FIG. 4, the temporal attention model 440 receives inputs $h_{t-1}$ and $c_{t-1}$. A matrix product of the inputs $h_{t-1}$ and $c_{t-1}$ may be performed, where the results are forwarded to a softmax layer for attention selection. The softmax layer may generate a temporal attention $\beta_t$ corresponding to the $t^{th}$ state summary. A matrix product of the temporal attention $\beta_t$ (e.g., attention weights) and the hidden variable $h_{t-1}$ may be forwarded to the fully connected (FC) layers and the tanh layer to obtain class probability distribution $P=\{p_t\}_{t=1}^T$.

Visual attention has been shown to be an effective mechanism in image applications, by selectively focusing on certain regions in images. In this aspect of the present disclosure, the spatial attention model 420 is relied on for region selection. First, the inputs $Z^l$, D convolutional layers $\phi 1$ and $\phi 2$ with kernel size 1 are provided. The convolutional layer $\phi 1$ has both input and output channel d, while the convolutional layer $\phi 2$ has input channel d and output channel 1. Then, the 2D attention weights $\alpha_t(i, j)$ for each time step t at coordinate (i, j) are defined by:

$$\alpha_t = W_a \tanh\left(W_a^z \phi_2(\phi_1(z_t^l)) + W_a^h h_t + b_a^{zh}\right) + b_a, \quad (2)$$

$$\alpha_t(i, j) = \frac{\exp(a_t(i, j))}{\sum_i \sum_j \exp(a_t(i, j))}, a_t \in \mathbb{R}^2, \quad (3)$$

where $W_a$, $W_a^z$, $W_a^h$ are the learnable parameter matrices, and $b_a^{zh}$, $b_a$ are the bias vectors. The attention weight $\alpha_t$ is a 2D matrix where each cell spatially corresponds to the vector in $z_t^l$. A softmax selection is adopted to emphasize the corresponding regions in the latent features. By performing element-wise production with $\alpha_t$, the weighted $z_t^l$ are forwarded to the $CNN_{end}$ of the CNN 410.

In a sequence, the input at each time t contains temporal information with different importance for the final classification. For example, the moment when taillights are flashing is more valuable than others while the network tries to recognize the state of the vehicle's taillights. Hence, an attention model is equipped along a temporal direction to emphasize critical moments for vehicle taillight recognition.

Based on the outputs provided by the LSTM network 430, the temporal attention model 440, and the spatial attention model 420 are integrated into the CNN-LSTM framework 400. For example, a temporal attention fit $\beta_{t,u}$ corresponding to the $t^{th}$ state summary and the $u^{th}$ hidden variable is computed as a dot-product between $d_t$ and $h_u$, and then followed by a soft-selection:

$$\beta_{t,u} = \frac{\exp(d_t \cdot h_u)}{\sum_{k=1}^T \exp(d_t \cdot h_k)} \quad (4)$$

In EQUATION 4, the state summary $d_t$ at time step t is defined by:

$$d_t = W_d^h h_t + W_d^c \tanh(c_t) + b_d^{hc}, \quad (5)$$

where $W_d^h$, $W_d^c$ the learnable parameter matrices, and $b_d$ is a bias vector. This implies how the $u^{th}$ input contributes to the $t^{th}$ output. Therefore, the output hidden variable is adjusted according to $\beta_{t,u}$, $$h'_t = \sum_{u=1}^T \beta_{t,u} h_u, \quad (6)$$

The adjusted hidden variable $h'_t$ is then forwarded to the fully connected layers and tanh layer to obtain a final prediction $p_t$ for the $t^{th}$ time step:

$$p_t = W_p \tanh(W_p^h h'_t c_j + b_p^{hc}) + b_p, \quad (7)$$

where $W_p$, $W_p^h$, $W_p^c$ are the learnable parameter matrices, and $b_p^{hc}$, $b_a$ are the bias vectors.

During training, the objective loss is cross entropy loss between the predictions and labels. To take the temporal dependence of an input sequence into account, we focus on the prediction of the last frame (e.g., $p_T$) containing sufficient information from all the previous frames. In other words, the loss of the last frame is computed and back propagated to all frames in the sequence with the same loss.

Due to the mutual influence of the three models, the CNN-LSTM framework 400 is optimized effectively. First, the CNN 410 along with LSTM network 430 are trained from scratch. This allows the main stream of the CNN-LSTM framework 400 to achieve certain convergence. Then, the CNN-LSTM framework 400, along with the temporal attention model 440, are fine-tuned based on the pre-training of the spatial attention model 420 in the first step. Finally, the spatial attention model 420, the temporal attention model 440, and the CNN-LSTM framework 400 are fine-tuned from the pre-training of the temporal attention model 440 in the second step. Such progressive training can enable effective network convergence and better performance results.

For example, after learning, the CNN-LSTM framework 400 is equipped with attention models (e.g., 420 and 440) for spatial and temporal dimensions. The spatial attention model 420 and the temporal attention model 440 enable the CNN-LSTM framework 400 to emphasize focal regions of the images of the input image sequence 402, as well as more important time steps of the input image sequence 402. In one aspect of the present disclosure, integration of the spatial attention model 420 with the CNN 410 of the CNN-LSTM framework 400 enables training of the CNN-LSTM framework 400 to selectively focus on certain images in the input image sequence 402 for region selection. In addition, integration of the temporal attention model 440 with the LSTM network 430 of the CNN-LSTM framework 400 helps train the LSTM network 430 to perform frame selection within the sequence of images from the region selection. For example, the spatial attention model 420 may be configured along a temporal dimension (e.g., direction) to focus on portions of the sequence of images from the region selected as important to vehicle taillight recognition.

Figure 5A:
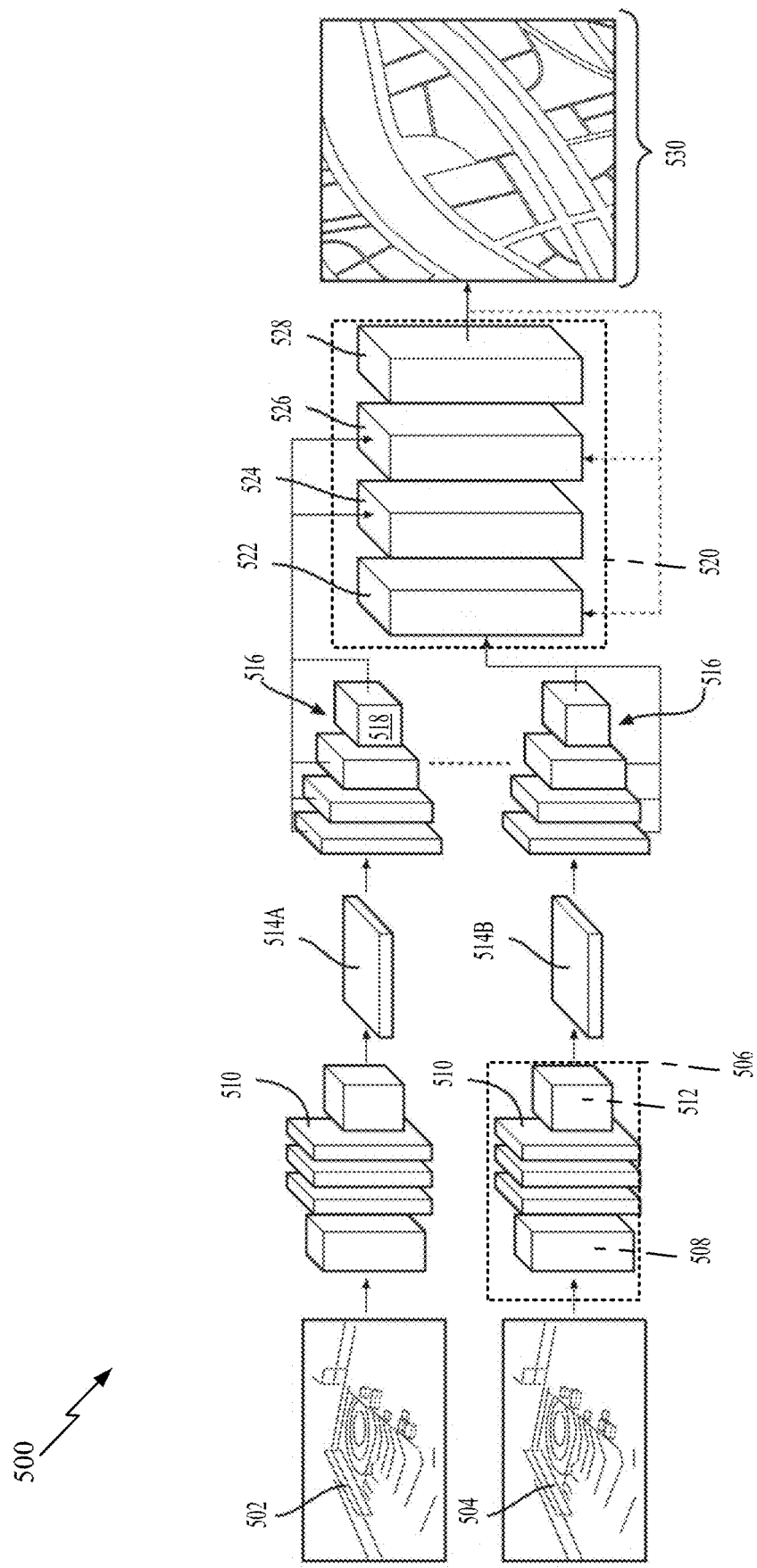
FIG. 5A is a block diagram illustrating an example of a flow network, in accordance with various aspects of the present disclosure.

Furthermore, as discussed, in some examples, a velocity of objects in a scene may be determined by a machine learning model. In some such examples, a flow network is used to determine a velocity of objects in a scene. FIG. 5A is a block diagram illustrating an example of a flow network 500, in accordance with various aspects of the present disclosure. The flow network 500 may be a component of the taillight recognition system 390 described with reference to FIG. 3. Additionally, or alternatively, one or more elements of the flow network 500 may be executed via the SOC 130 and/or processor 320 as described with reference to FIGS. 1 and 3, respectively. The flow network 500 may estimate a 2D birds-eye view (BeV) flow by combining a pillar feature network 506 and a flow estimation network 520.

As shown in the example of FIG. 5A, a pillar feature network 506 may receive a first LiDAR sweep 502 associated with a current time (t) and a second LiDAR sweep 504 associated with a previous time (t−1). The two sweeps 502, 504 may be consecutive in time and may be aligned into a same coordinate frame. That is, the original coordinates of the second LiDAR sweep 504 may be transformed to a coordinate frame of the first LiDAR sweep 502 using the odometry information of an ego agent, such as the vehicle 100 described with reference to FIGS. 1A, 1B, 1C, and 3. The LiDAR sweeps 502, 504 may be referred to as point clouds or 3D point clouds. The two point clouds 502, 504 may be encoded by the pillar feature network 506 to generate two BeV pseudo-images 514A, 514B, where each cell in the BeV pseudo-images 514A, 514B has a learned embedding based on points that fall inside it.

As discussed, the pillar feature network 506 may be used to extract two BeV pseudo-images 514A, 514B from 3D point clouds 502, 504. In some examples, the same pillar feature network 506 may be used to process each 3D point cloud 502, 504. In other examples, different pillar feature networks 506 may be used to process each 3D point cloud 502, 504. In such examples, the different pillar feature networks 506 may share weights for a point network 510. The process for extracting each BeV pseudo-image 514A, 514B may include voxelizing a respective point cloud 514A, 514B via a voxelizer 508. The voxelizer 508 may discretize an x-y plane, thus creating a set of pillars (e.g., grid cells) in birds-eye-view. The vowelizing point cloud may be structured as a (D, P, N)-shaped tensor where the variable D represents a number of point descriptors, the variable P represents a number of pillars, and the variable N represents a number of points per pillar. In some examples, the number of point descriptors D may be set to nine, where the first four values denote coordinates x, y, z, and reflectance r. The next five values are the distances to an arithmetic mean $x_c$, $y_c$, $z_c$, of all points in a pillar and an offset $x_p$, $y_p$ from a pillar center.

The tensor generated by the voxelizer 508 may be processed by a multi-layered point network (e.g., pointnet) 510. The pointnet 510 may generate a feature map having a shape (C, P, N). The feature map may be compressed by a max operation over a last dimension, resulting in a (C, P) encoded feature map with a C-dimensional feature embedding for each pillar. Finally, the encoded features may be scattered back to original pillar locations, via a scatter module 512, to create a BeV pseudo-image tensor 514A or 514B having a shape (C, H, W), where H indicates a height and W indicates a width of the BeV pseudo-image 514A or 514B.

In some examples, a 2D BeV flow estimation is performed to accurately associate the embeddings (e.g., pillar features) between the 2D BeV pseudo-images 514A, 514B. In some examples, architecture parameters such as receptive field and correlation layer parameters may be adjusted to account for a maximum relative motion that would be expected to be encountered between consecutive LiDAR sweeps 502, 504 (given the time delta between frames, grid resolution, and typical vehicle speeds). As shown in FIG. 5A, the pillar features may be further encoded via a feature pyramid network 516. The feature pyramid network 516 may include multiple layers 518. The encoded features of the second point cloud 504 may be warped based on a warping function 522. The warping function 522 may align the tail lights between two images. A cost volume layer 524 is then used to estimate the flow between the first point cloud 502 and the second point cloud 504 by matching a cost. That is, the cost volume layer 524 may determine a correlation between the two feature maps associated with the point clouds 502, 504. The flow estimator 526 may fuse extracted features in a current scale level with the estimated flows from lower scales. Finally, a context network 528 is applied to exploit contextual information for additional refinement.

The context network 528 is a feed-forward CNN based on dilated convolutions, along with batch normalization and rectified linear activation unit (ReLU). As shown in FIG. 5A, the features received at the warping function 522, and flow estimator 526 may be upsampled.

The 2D BeV flow 530 generated by the flow network 500 may identify the motion of objects surrounding an ego agent associated with the flow network 500. In some examples, the 2D BeV flow 530 may include a 2D flow vector for each grid cell. In such examples, the 2D flow vector may be a single mean velocity and co-variance per object cluster. A grid cell may be a cell in an occupancy grid map (OGM). Occupancy grid maps may be used to represent scene obstacle occupancy for robotics applications. Estimation of a per cell motion state within an occupancy grid may be referred to as dynamic occupancy grid map (DOGMa) estimation.

Figure 5B:
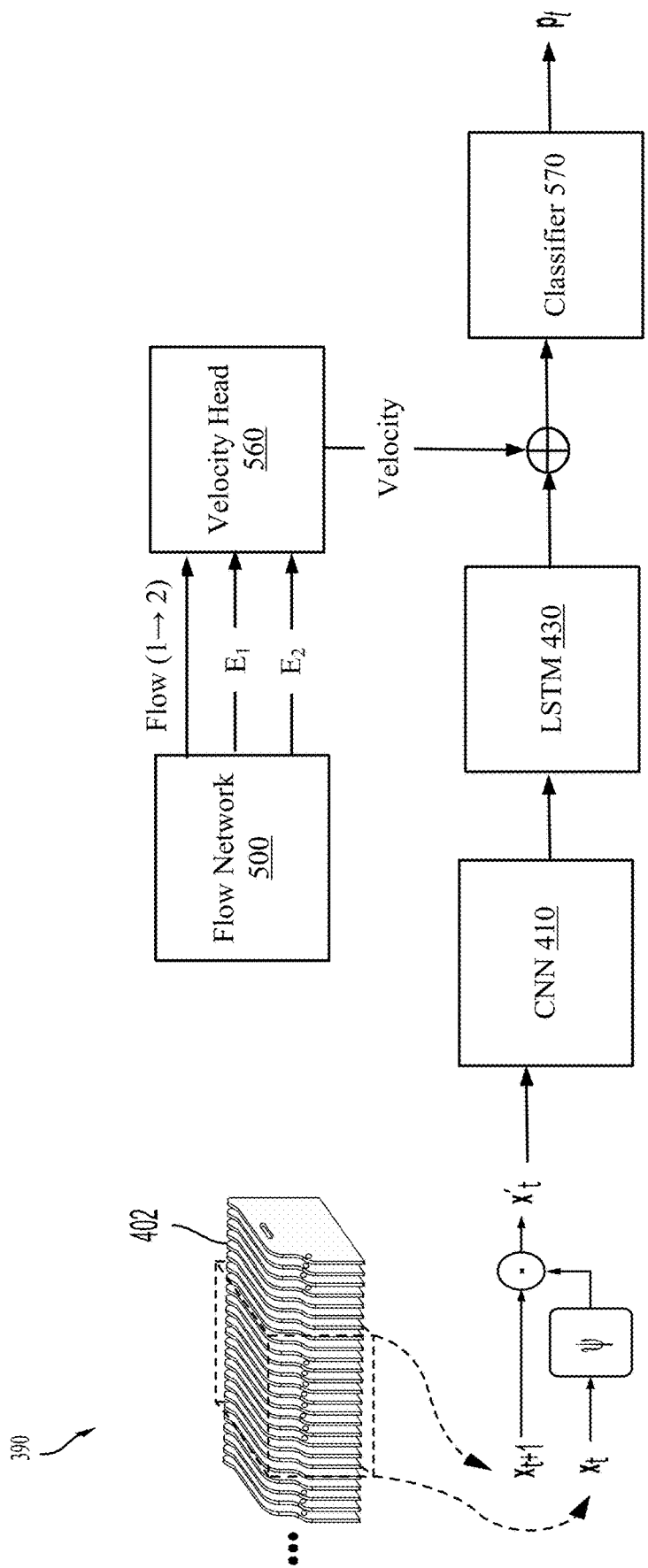
FIG. 5B is a block diagram illustrating an example of an end-to-end framework for a taillight recognition system that uses velocity as a prior for predicting an intent of a vehicle, in accordance with various aspects of the present disclosure.

FIG. 5B is a block diagram illustrating an example of an end-to-end framework for a taillight recognition system 550 that uses velocity as a prior for predicting an intent of a vehicle, in accordance with various aspects of the present disclosure. In some examples, the taillight recognition system 550 may be a component of a vehicle, such as an ego vehicle 100. Additionally, the taillight recognition system 550 may determine an intent of one or more other vehicles, such as ADO vehicles.

As shown in the example of FIG. 5B, a CNN 410 receives an input image sequence 402 as described with reference to FIG. 4. The CNN 410 may output latent features of the input image sequence 402 to the LSTM network 430. The latent features may include spatial and temporal features generated by one or more images. Additionally, as shown in the example of FIG. 5B, a flow network 500 may generate a 2D flow vector for each grid cell in a scene. As discussed, the 2D flow vector represents a single mean velocity and co-variance per object cluster. The 2D flow vector may be processed by a velocity head 560 to determine a velocity of each object. In some examples, as shown in FIG. 5B, the 2D flow vector (e.g., flow from time t−1 to time t, shown as flow (142)) and the embedding E1 and E2 from the respective BeV pseudo-images 514A, 514B may be processed by a velocity head 560 to determine a velocity of each object in a scene (e.g., environment).

The velocity may be concatenated with an output of the LSTM network 430, such as, $h_{t-1}$ and $c_{t-1}$ as shown in FIG. 4. The output of the LSTM network 430 may be a selected region in a frame. The selected region may be a region corresponding to a taillight of one or more objects in a frame. As discussed, the selected region may be concatenated with a respective velocity instance label of each object of the one or more objects within the environment to generate a concatenated region label. The velocity instance label may be generated by the velocity head 560. In some other examples, a temporal attention model 440 may be optional and the concatenated output of the LSTM network 430 may be received directly at the classifier. In such examples, the LSTM network 430, selects frames within the selected region of the sequence of images according to a temporal attention model for the vehicle taillight recognition task. Additionally, in such examples, the velocity instance label may be concatenated with the selected frames within the selected region.

The concatenated output may be processed by a classifier 570 to predict an intent of a vehicle (e.g., an ADO vehicle) in the input image sequence 402. The classifier 570 may infer an intent of each object of the one or more objects according to a respective taillight state of each object, as determined based on the concatenated region label.

As shown in FIG. 5B, the velocity predicted by the velocity head 560 may be associated with a velocity loss $\mathcal{L}_v$. Furthermore, the prediction by the classifier 570 may be associated with a classification loss $\mathcal{L}_{class}(c, g)$. During training, the taillight recognition system 550 may be trained to reduce a total loss $\mathcal{L}_{total}$, which may be a sum of velocity loss $\mathcal{L}_v$, the classification loss $\mathcal{L}_{class}(c, g)$, and an optical flow loss $\mathcal{L}_f$, where the variable c represents a predicted class and the variable g represents a ground truth, such that the loss is determined based on the predicted class and the groundtruth class. During training, annotated object tracks may be used to generate one or more 2D BeV flow ground truths. For each object, the training estimates the instantaneous velocity from the difference in object positions divided by the elapsed time between consecutive frames. Additionally, during training, it is assumed that only labeled dynamic objects can have a valid velocity, and non-labeled obstacles and background should have zero velocity. Note this assumption may be violated in practice and does not provide direct supervision for potential out-of-ontology moving objects, still, static objects have zero flow. The optical flow loss optical flow loss Lf captures the loss between the labeled dynamic objects associated with a velocity, non-labeled obstacles and background associated with a zero velocity, and respective groundtruths.

As discussed, in some implementations, the taillight recognition system 390 is trained end-to-end. The end-to-end training may improve an overall parked car classification. That is, because the taillight recognition system 390 is trained end-to-end, the total loss $\mathcal{L}_{total}$, which may be a sum of the velocity loss $\mathcal{L}_v$, the classification loss $\mathcal{L}_{class}(c, g)$, and the optical flow loss $\mathcal{L}_f$, may be minimized for the system as a whole. In contrast, conventional systems are not trained end-to-end. Rather, conventional parked car classification systems may separately train each component. Because each component is separately trained, the loss may not be minimized for the system as a whole, therefore, the parked car classification may less accurate in comparison to a system that is trained end-to-end.

Figure 5C:
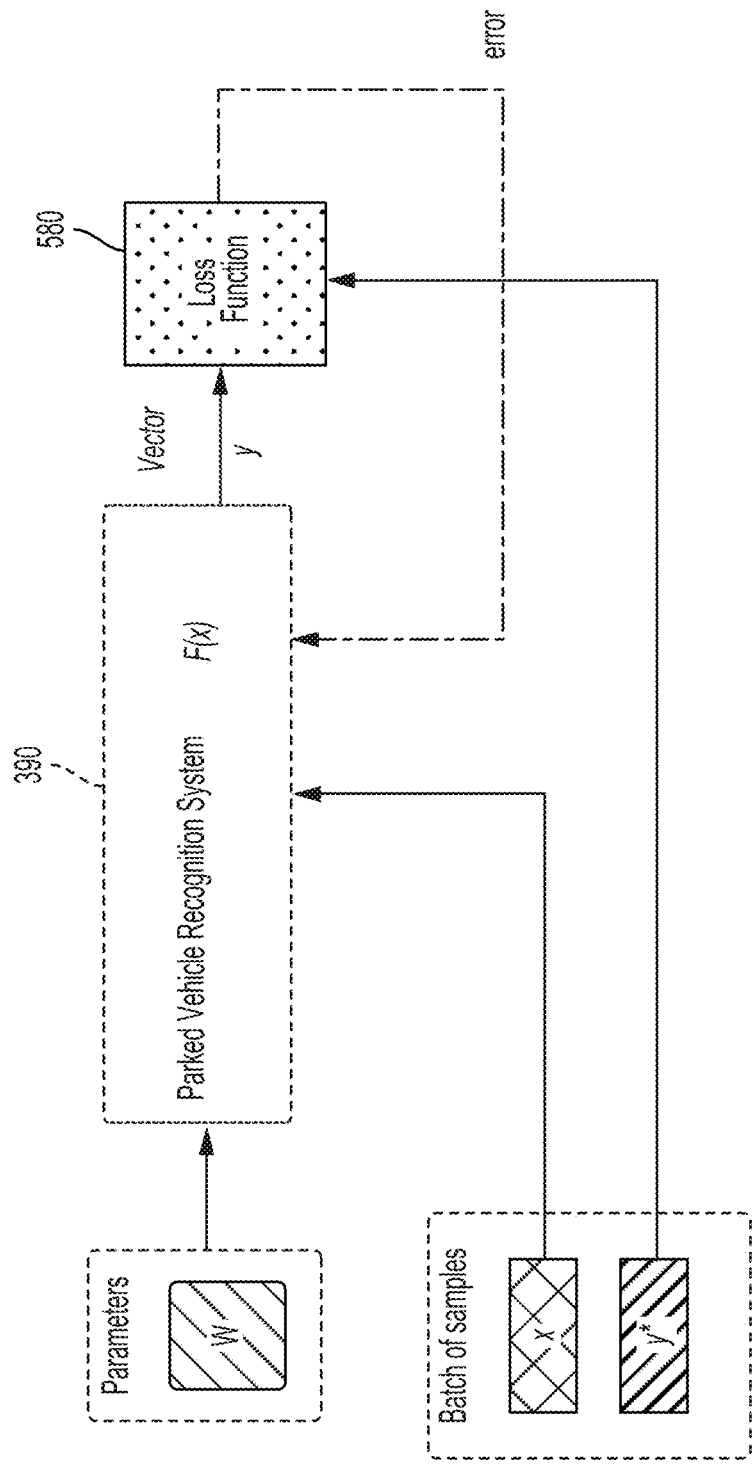
FIG. 5C illustrates a block diagram for training a parked vehicle recognition system, in accordance with various aspects of the present disclosure.

FIG. 5C illustrates a block diagram for training a taillight recognition system 390, in accordance with various aspects of the present disclosure. In one configuration, data (x) may be received from different sensors of the vehicle 100 and/or other information sources. As an example, the data (x) may include the LiDAR sweeps 502, 504, the input sequence 402 and/or other features as described in FIGS. 4, 5A, and 5B. The data source may also store ground truth vectors (y*) corresponding to the sensor data (x). The ground truth vectors (y*) may store ground truth information for the flow determined by the flow network 500, the velocity determined by the velocity network 560, and the parked car classification determined by the parked vehicle classifier 570.

The parked vehicle recognition system 390 may be initialized with a set of parameters w. The parameters may be used by layers of the parked vehicle recognition system 390 to set weights and biases of the associated networks, such as the vehicle feature model 500, the flow network 520, the velocity network 570, and/or the parked vehicle classifier 550. During training, the taillight recognition system 390 receives sensor data (x) to transform the sensor data (x) to a vector (y). In the example of FIG. 5D, the taillight recognition system 390 is represented as a function FO. The output (y) includes the flow estimation, the velocity estimation, and the taillight classification.

The output (y) of the parked vehicle recognition system 390 is received at a loss function 580. The loss function 580 compares the output (y) to the ground truth vector (y*). The error is the difference (e.g., loss) between the output (y) and the ground truth vector (y*). The error is output from the loss function 608 to the model 600. The error is backpropagated through the parked vehicle recognition system 390 to update the parameters. The training may be performed during an offline phase of the taillight recognition system 390. As discussed, the taillight recognition system 390 may be trained to reduce a total loss $\mathcal{L}_{total}$, which may be a sum of the velocity loss $\mathcal{L}_v$, the classification loss $\mathcal{L}_{class}(c, g)$, and the optical flow loss $\mathcal{L}_f$.

Figure 6:
FIG. 6 illustrates examples of vehicle taillight states, in accordance with various aspects of the present disclosure.

FIG. 6 illustrates examples 600 of different vehicle taillight states, in accordance with various aspects of the present disclosure. The taillight examples of FIG. 6 may be identified by a taillight recognition system, such as the taillight recognition system 390 described with reference to FIGS. 3, 5B, and 5C.

In the example of FIG. 6, eight different taillight states a-h are based on all combinations of brake and turn lights. As shown in examples (a)-(h), each state is denoted by three letters of "B" (brake), "L" (left), and "R" (right), in which either the corresponding letter is displayed when on, or a letter "O" (off) is displayed the corresponding signal is off. For example, in example (a), all taillights are off (OOO). In example (b), only the brake light is on (BOO); in example (c) only the left turn light is on (OLO); in example (d), both the brake light and the left turn light are on (BLO); in example (e), only the right turn light is on (OOR); in example (f), both the brake light and the right turn light are on (BOR); in example (g), both the left turn light and the right turn light are on (OLR); and in example (h), all the taillights are on (BLR).

As discussed, example (e) of FIG. 6 is an example of an "OOR" taillight state, in which the right-turn signal is flashing. From frame 1, the spatial attentions are uniformly on the rear of the vehicle. With the right-turn signal off from frame 2 to frame 3, the spatial attention emphasizes the region of the right-turn signal until the last frame. Then, the temporal attention pays increased attention to frame 4, while the right-turn signal is on at this time step. Meanwhile, the temporal attention weight goes up to 0.8, which implies that the network pays more attention to significant changes of the signal.

Additionally, example (h) of FIG. 6 is an example of "BLR" taillight state, in which the brake signal is on and both turn signals are flashing. In some examples, the spatial attention focuses on both sides of the vehicle. Both left-turn and right-turn signals start to turn on at frame 4. This triggers the network to pay temporal attention to frame 4. The signals stay off until frame 7, while the temporal attention weight goes up to 0.6, which is higher than that in frame 4. This occurs because the CNN-LSTM framework 400 tends to learn a cycle of signal flashing for this chunk of sequences from the input image sequence 402.

Figure 7:
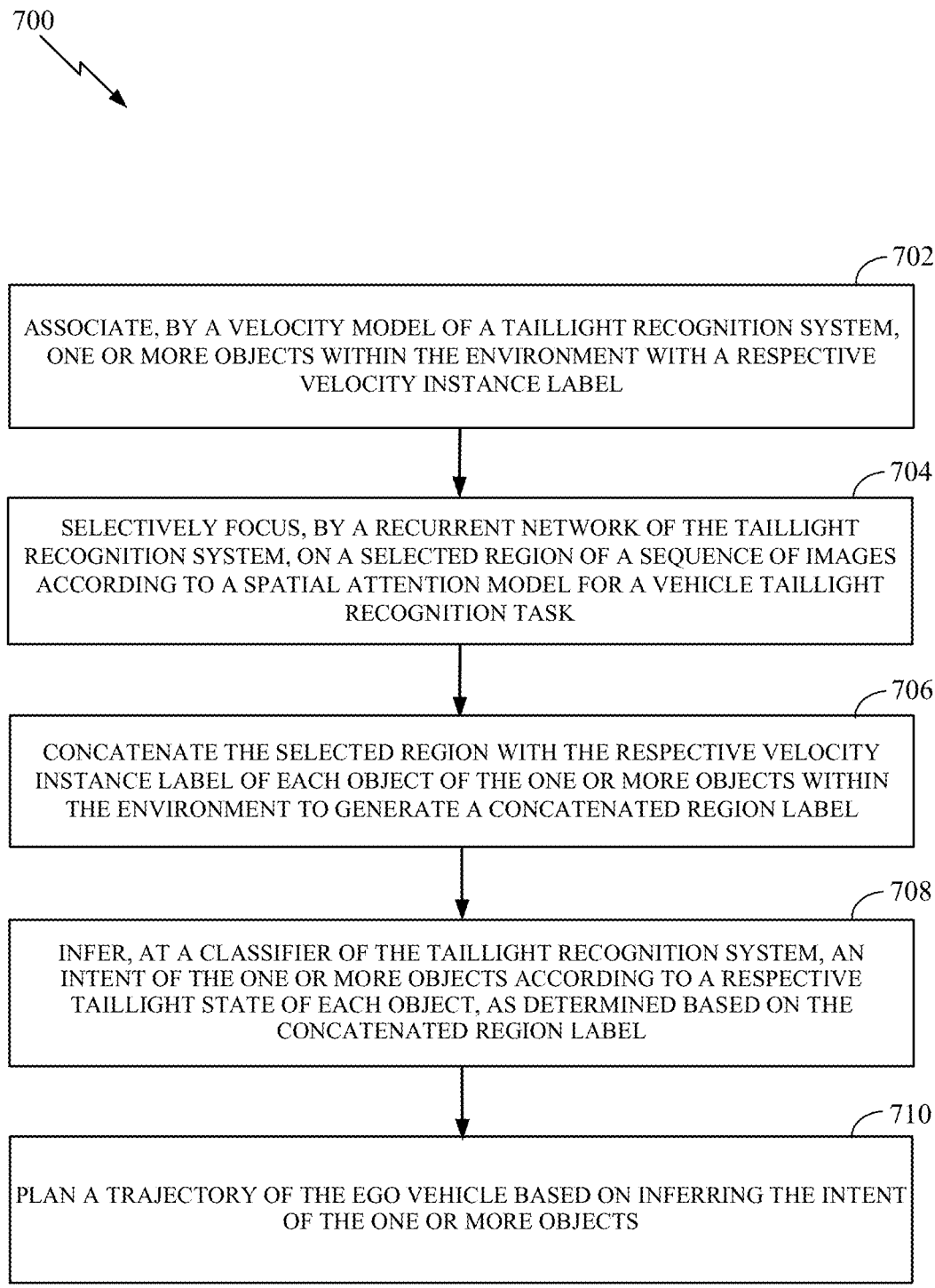
FIG. 7 is a flowchart illustrating a method for vehicle taillight recognition, in accordance with various aspects of the present disclosure.

FIG. 7 is a flowchart illustrating a process 700 for vehicle taillight recognition, according to aspects of the present disclosure. The process 700 may be performed by the taillight recognition system 390 and/or associated components, as described with reference to FIGS. 3, 4, 5A, 5B, and 5C. As shown in FIG. 7, the process 700 begins by associating, by a velocity model (e.g., velocity head 560) of a taillight recognition system, one or more objects within the environment with a respective velocity instance label. In some examples, the process 700 generating, via a flow model (e.g., flow network 500) of the taillight recognition system, a two-dimensional (2D) flow vector for each cell grid of a group of cell grids based on a first representation and a second representation of the environment. The process 700 may then determine the respective velocity instance label of each object of the one or more objects based on the 2D flow vector for each cell grid. In such examples, the process 700 may obtain the first representation via a first light detection and ranging (LiDAR) sweep performed at a first time period, and also obtain the second representation via a second LiDAR sweep performed at a second time period.

At block 704, the process 700 selectively focuses, by a recurrent network (e.g., LSTM 430) of the taillight recognition system, on a selected region of a sequence of images according to a spatial attention model for a vehicle taillight recognition task. In some examples, the process 700 identifies regions of interest in the sequence of images. In such examples, the selected region is the region of interest.

At block 706, the process 700 concatenates the selected region with the respective velocity instance label of each object of the one or more objects within the environment to generate a concatenated region label. At block 708, the process 700 infers, at a classifier (e.g., classifier 570) of the taillight recognition system, an intent of the one or more objects according to a respective taillight state of each object, as determined based on the concatenated region label. At block 710, the process 700 plans a trajectory of the ego vehicle based on inferring the intent of the one or more objects. In some examples, planning the trajectory includes adjusting the trajectory of the ego vehicle to avoid a collision with one object of the one or more objects.

In some examples, the flow model is associated with a flow loss, the velocity model is associated with a velocity loss, and the classifier is associated with a classification loss. Furthermore, the process 700 may train the taillight recognition system in an end-to-end manner to minimize a sum of the flow loss, the velocity loss, and the classification loss.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for controlling an ego vehicle in an environment, comprising:
    associating, by a velocity model of a taillight recognition system associated with the ego vehicle, a vehicle within the environment with a velocity instance label, the velocity instance label indicating a speed and direction of the vehicle;
    selectively focusing, by a recurrent network of the taillight recognition system, on a first region of a sequence of images according to a spatial attention model for a vehicle taillight recognition task, the first region corresponding to a taillight of the vehicle;
    concatenating, at the taillight recognition system, the first region with the velocity instance label of the vehicle to generate a concatenated region label, such that the velocity instance label is associated with the taillight of the vehicle;
    inferring, at a classifier of the taillight recognition system, an intent of the vehicle according to a taillight state of the vehicle and the concatenated region label; and
    planning a trajectory of the ego vehicle based on inferring the intent of the vehicle.

2. The method of claim 1, further comprising identifying one or more regions of interest in the sequence of images, wherein the first region is one region of the one or more regions of interest.

3. The method of claim 1, wherein planning the trajectory includes adjusting the trajectory of the ego vehicle to avoid a collision with the vehicle.

4. The method of claim 1, further comprising:
    generating, via a flow model of the taillight recognition system, a two-dimensional (2D) flow vector for each cell grid of a plurality of cell grids based on a first representation and a second representation of the environment; and
    determining the velocity instance label of the vehicle based on the 2D flow vector for each cell grid.

5. The method of claim 4, further comprising:
    obtaining the first representation via a first light detection and ranging (LiDAR) sweep performed at a first time period; and
    obtaining the second representation via a second LiDAR sweep performed at a second time period.

6. The method of claim 4, wherein the flow model is associated with a flow loss, the velocity model is associated with a velocity loss, and the classifier is associated with a classification loss.

7. The method of claim 6, further comprising training the taillight recognition system in an end-to-end manner to minimize a sum of the flow loss, the velocity loss, and the classification loss.

8. An apparatus for controlling an ego vehicle in an environment, comprising:
    at least one processor; and
    at least one memory coupled with the at least one processor and storing instructions operable, when executed by the at least one processor, to cause the apparatus to:
        associate, by a velocity model of a taillight recognition system associated with the ego vehicle, a vehicle within the environment with a velocity instance label, the velocity instance label indicating a speed and direction of the vehicle;
        selectively focus, by a recurrent network of the taillight recognition system, on a first region of a sequence of images according to a spatial attention model for a vehicle taillight recognition task, the first region corresponding to a taillight of the vehicle;
        concatenate, at the taillight recognition system, the first region with the velocity instance label of the vehicle to generate a concatenated region label, such that the velocity instance label is associated with the taillight of the vehicle;

infer, at a classifier of the taillight recognition system, an intent of the vehicle according to a taillight state of the vehicle and the concatenated region label; and plan a trajectory of the ego vehicle based on inferring the intent of the vehicle.

9. The apparatus of claim 8, wherein execution of the instructions further cause the apparatus to identify one or more regions of interest in the sequence of images, wherein the first region is one region of the one or more regions of interest.

10. The apparatus of claim 8, wherein execution of the instructions to plan the trajectory further cause the apparatus to adjust the trajectory of the ego vehicle to avoid a collision with the vehicle.

11. The apparatus of claim 8, wherein execution of the instructions further cause the apparatus to:

generate, via a flow model of the taillight recognition system, a two-dimensional (2D) flow vector for each cell grid of a plurality of cell grids based on a first representation and a second representation of the environment; and determine the velocity instance label of the vehicle based on the 2D flow vector for each cell grid.

12. The apparatus of claim 11, wherein execution of the instructions further cause the apparatus to:

obtain the first representation via a first light detection and ranging (LiDAR) sweep performed at a first time period; and obtain the second representation via a second LiDAR sweep performed at a second time period.

13. The apparatus of claim 11, wherein the flow model is associated with a flow loss, the velocity model is associated with a velocity loss, and the classifier is associated with a classification loss.

14. The apparatus of claim 13, wherein execution of the instructions further cause the apparatus to train the taillight recognition system in an end-to-end manner to minimize a sum of the flow loss, the velocity loss, and the classification loss.

15. A non-transitory computer-readable medium having program code recorded thereon for controlling an ego vehicle in an environment, the program code executed by a processor and comprising:

program code to associate, by a velocity model of a taillight recognition system associated with the ego vehicle, a vehicle within the environment with a velocity instance label, the velocity instance label indicating a speed and direction of the vehicle;

program code to selectively focus, by a recurrent network of the taillight recognition system, on a first region of a sequence of images according to a spatial attention model for a vehicle taillight recognition task, the first region corresponding to a taillight of the vehicle;

program code to concatenate, at the taillight recognition system, the first region with the velocity instance label of the vehicle to generate a concatenated region label, such that the velocity instance label is associated with the taillight of the vehicle;

program code to infer, at a classifier of the taillight recognition system, an intent of the vehicle according to a taillight state of the vehicle and the concatenated region label; and program code to plan a trajectory of the ego vehicle based on inferring the intent of the vehicle.

16. The non-transitory computer-readable medium of claim 15, wherein the program code further comprises program code to identify one or more regions of interest in the sequence of images, wherein the first region is one region of the one or more regions of interest.

17. The non-transitory computer-readable medium of claim 15, wherein the program code further comprises program code to adjust the trajectory of the ego vehicle to avoid a collision with the vehicle.

18. The non-transitory computer-readable medium of claim 15, wherein the program code further comprises:

program code to generate, via a flow model of the taillight recognition system, a two-dimensional (2D) flow vector for each cell grid of a plurality of cell grids based on a first representation and a second representation of the environment; and program code to determine the velocity instance label of the vehicle based on the 2D flow vector for each cell grid.

19. The non-transitory computer-readable medium of claim 18, wherein the program code further comprises:

program code to obtain the first representation via a first light detection and ranging (LiDAR) sweep performed at a first time period; and program code to obtain the second representation via a second LiDAR sweep performed at a second time period.

20. The non-transitory computer-readable medium of claim 18, wherein:

the flow model is associated with a flow loss, the velocity model is associated with a velocity loss, and the classifier is associated with a classification loss; and the program code further comprises program code to train the taillight recognition system in an end-to-end manner to minimize a sum of the flow loss, the velocity loss, and the classification loss.

\* \* \* \* \*